United States Patent [19] [11] 4,313,800

Sondermann [45] Feb. 2, 1982

[54] METHOD OF RECONDITIONING RADIOACTIVE FILTRATE

[75] Inventor: Thomas Sondermann, Kahl, Fed. Rep. of Germany

[73] Assignee: Reaktor-Brennelement Union GmbH, Hanau, Fed. Rep. of Germany

[21] Appl. No.: 108,408

[22] Filed: Dec. 31, 1979

[30] Foreign Application Priority Data

Jan. 12, 1979 [DE] Fed. Rep. of Germany ....... 2901067

[51] Int. Cl.[3] ......................... C25B 1/00; C01G 43/00

[52] U.S. Cl. ................................................. 204/1.5

[58] Field of Search ........................ 204/1.5, 235, 236; 423/253

[56] References Cited

U.S. PATENT DOCUMENTS 3,143,483 8/1964 Le Bris et al. ....................... 204/1.5

3,821,091 6/1974 Bilal et al. ............................ 204/1.5

3,948,735 4/1976 Hayden et al. ...................... 204/1.5

4,152,238 5/1979 Okazaki .............................. 204/236

*Primary Examiner*—Edward A. Miller

*Attorney, Agent, or Firm*—Herbert L. Lerner; Laurence A. Greenberg

[57] ABSTRACT

Reconditioning ammonium nitrate-containing radioactive filtrates as produced in AUC or AU Pu C process by feeding preheated filtrate into the cathode chamber of an electrolysis cell containing boiling ammonium nitrate solution. The filtrate is brought to the boiling temperature with the assistance of the joulean heat of the electrolysis current. Ammonium carbonate and free $NH_3$ in the filtrate are given off as gaseous $CO_2$ and $NH_3$ and steam and electrolytically formed $NH_3$. The uranium and/or plutonium originally in solution as carbonate complexes is precipitated and separated by continuous circulation of the cell contents through a filter as well as electrolytically at the cathode.

8 Claims, 1 Drawing Figure

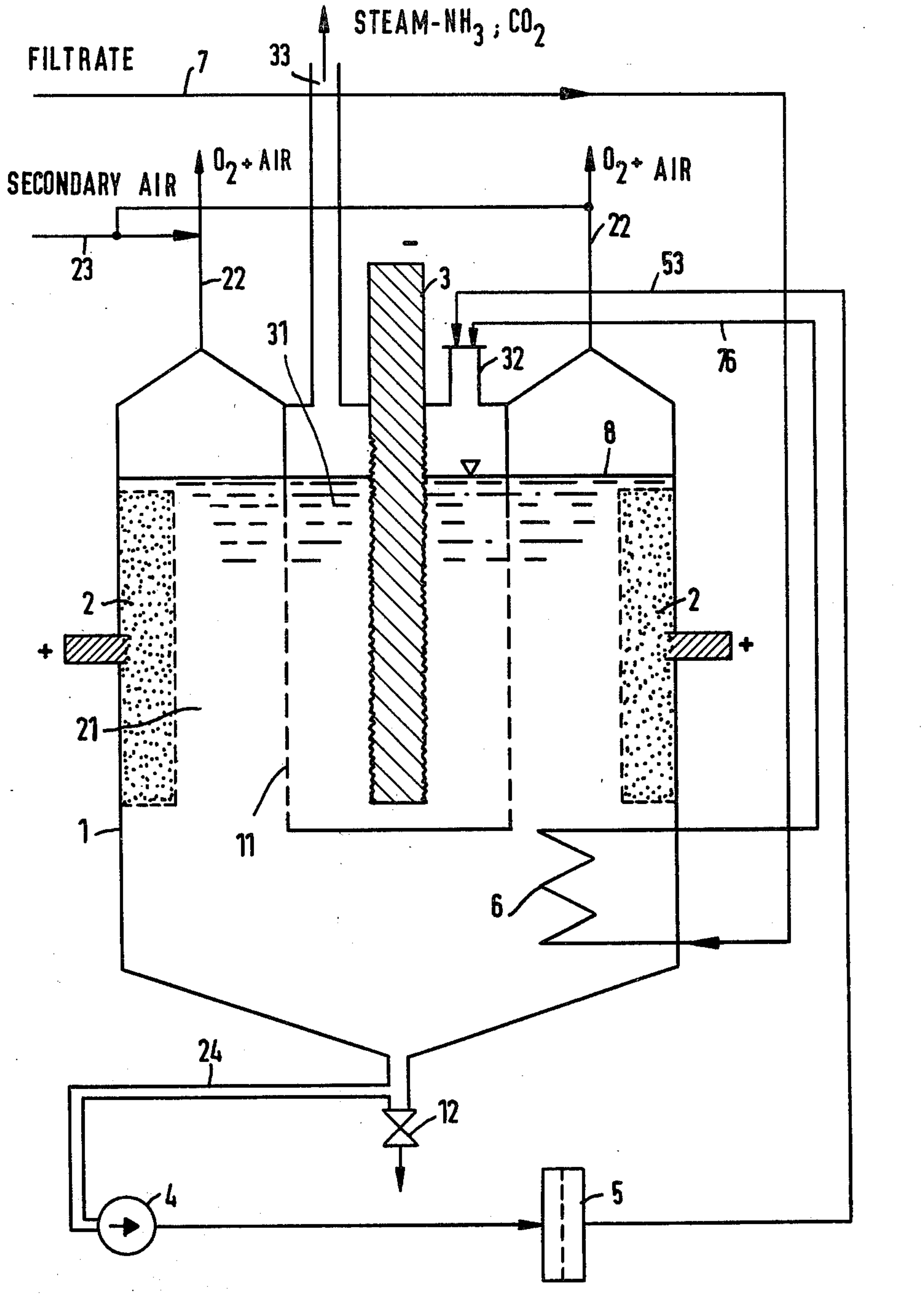
STEAM-NH3 ; CO2
FILTRATE
7
33
SECONDARY AIR
O2+AIR
O2+AIR
23
22
22
3
53
31
32
76
8
2
2
21
1
11
6
24
12
4
5

METHOD OF RECONDITIONING RADIOACTIVE FILTRATE

BACKGROUND OF THE INVENTION

1. Field of the Invention

The present invention relates to reconditioning ammonium-nitrate-containing radioactive filtrates such as are produced in the AUC (ammonium uranyl carbonate) or the AUPuC process.

2. Description of the Prior Art

In the AUC process, which is described in detail in German Published Non-Prosecuted Applications Nos. 195 24 77 and 159 24 71, filtrates are produced which have the following composition if uranyl nitrate was the starting product:

| | |
|---|---|
| Approximately | 100 g/l $NH_4$ |
| " | 150 g/l $NO_3$ |
| " | 90 g/l $CO_3$ |
| " | 300 mg/l U |

The filtrates from the AUPuC process are similar; the plutonium content is an added component.

If unirradiated and plutonium free uranyl nitrate is used as the starting product, the filtrate from the nuclear fuel production can be discharged into the sewer system after sufficient chemical separation of uranium and its decay products, without radiologically affecting the environment.

This is no longer possible, however, if irradiated uranium or plutonium is contained therein. Chemical decontamination is then no longer sufficient.

The filtrate volume coming from the nuclear fuel production is relatively large, so that it cannot be delivered to ultimate storage after solidification. It is necessary to find possibilities for reducing the volume to the greatest extent possible.

Complete evaporation is prohibited because of the danger of explosion which exists here because of the ammonium nitrate. However, the water must be separated from the radioactive components to reduce the volume; the ammonium nitrate must therefore be decomposed.

There are several methods for thermally decomposing this nitrate at temperatures above 250° C., wherein the water is evaporated with the decomposition products. The radioactive components remain in the reaction vessel.

These methods have the disadvantage that they can decompose the filtrates only if they have first been boiled down to 75–80% $NH_4NO_3$. The danger of an explosion cannot be precluded, however. In addition, the decomposition products generated cannot be recycled and can be reused only at great cost. The relatively high temperature level, in addition, makes these thermal processes relatively expensive. It should also be mentioned that the necessary cleaning of the equipment of the radioactive components (plutonium dust) is likewise a cause of problems.

SUMMARY OF THE INVENTION

An object of the present invention is to provide an economical method and apparatus for reconditioning radioactive filtrates of ammonium nitrate solution in which not only is a simple separation of the radioactive components effected but also the ammonium nitrate yields decomposition products which can be recycled into the nuclear fuel production. Furthermore, explosion danger from treatment of ammonium nitrate is minimized or eliminated.

With the foregoing and other objects in view, there is provided in accordance with the invention a method for reconditioning ammonium nitrate-containing radioactive filtrates which are aqueous solutions containing $NH_4$, $NO_3$, $CO_3$ and U and may also contain Pu, which comprises maintaining an electrolysis cell having an anode chamber and a cathode chamber and ammonium nitrate solution as electrolyte, decomposing water to oxygen and hydrogen in the electrolysis cell and also reducing nitrogen oxide in the cell with the hydrogen to produce $NH_3$, maintaining a boiling ammonium nitrate solution in the cathode chamber of the electrolysis cell, feeding said radioactive filtrate into the cathode chamber wherein this filtrate is brought to the boiling temperature with the assistance of the joulean heat of the electrolysis current, releasing gaseous $CO_2$ and $NH_3$ together with steam from the boiling ammonium nitrate solution in the cathode chamber, separately releasing oxygen from the anode chamber, converting soluble uranium compounds and plutonium if present in the ammonium nitrate solution to a precipitate containing uranium and plutonium if present suspended in the ammonium nitrate solution, recirculating said ammonium nitrate solution containing suspended precipitate through filter means to separate the precipitate, and also electrically precipitating dissolved uranium at the cathode.

In accordance with the invention, there is provided an apparatus for reconditioning ammonium nitrate-containing radioactive filtrates comprising an electrolysis cell constructed of a vessel to contain ammonium nitrate solution as electrolyte, a central cathode, a cylindrical anode, a partition between the anode and cathode electrodes to form a cathode chamber and an anode chamber, an opening in the cathode chamber for the introduction of filtrate feed, an outlet in the cathode chamber for the release of $NH_3$, $CO_2$ and steam, a second outlet in the anode chamber for the release of oxygen, a third outlet near the bottom of the vessel, filter means and conduit means and a pump for recirculating vessel contents from said third outlet through the filter to remove precipitate suspended in the vessel contents and return the vessel contents freed of precipitate to the cathode chamber.

Other features which are considered as characteristic for the invention are set forth in the appended claims.

Although the invention is illustrated and described herein as embodied in a method of reconditioning radioactive filtrate, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the operation, in which apparatus an electrolyte cell with an annular anode is partitioned from a central cathode, and means provided for recirculating and filtering cell contents.

DETAILED DESCRIPTION OF THE INVENTION

In accordance with the invention, the feed filtrate is preheated and fed into the cathode chamber of an electrolysis cell containing a boiling ammonium nitrate solution. Therein the feed filtrate is likewise brought to the boiling temperature with the assistance of the joulean heat of the electrolysis current and therewith gives off its content of ammonium carbonate and free $NO_3$ as gaseous $CO_2$ and $NH_3$, which are, together with the steam produced and the $NH_3$ electrolytically formed from the $NO_3^-$, discharged, preferably for reuse. The uranium and/or plutonium originally in solution as carbonate complexes is precipitated as diuranate etc. (hydroxide) and is separated through continuous recirculation of the cell content via a filter, as well as electrolytically at the cathode. The cell voltage is controlled so that the heat of dissipation due to the electrolysis current causes a volume of liquid to be evaporated which is approximately equal to that of the filtrate fed-in. This may therefore be operated as a continuous process, in which the fed-in filtrate volume corresponds to the volume evaporating in the electrolysis.

In the attached drawing, an apparatus for implementing the method is shown by way of an example and the following description gives further details of this method.

Referring to the drawing, the electrolysis cell 1 is constructed of a cylindrical vessel which is provided with an annular anode 2, made for example of graphite granulate, coated titanium or iron, and a rod-shaped profiled cathode 3 of alloy steel. A cylindrical partition 11 extends from the ceiling wall of the electrolytic tank 1 to several centimeters below the liquid level 8. This portion of partition 11 consists of alloy steel. Adjacent thereto and extending downwardly, the partition 11 is constructed of chemically stable porous insulating material such as polypropylene fabric and extends downward beyond the lower boundary of the electrodes. In this manner, the cathode space 31 is separated from the anode space 21 and aids in securing separate discharge of the reaction products from each chamber.

A heat exchanger 6 in the anode chamber of the electrolytic tank is connected on the inlet side to the feed line 7 for the filtrate to be reprocessed and is connected on the outlet side via the line 76 to the inlet stub 32 of the cathode chamber 31. The line 53 which leads from the pump 4 to the filter 5 is also then connected to stub 32. Electrolysis cell contents flow through the outlet stub 24 to the pump 4. The anode chamber 21, like the cathode chamber 31, filled only to barely above the anode 2 with an electrolyte 8, is provided with gas discharge lines 22. Similarly, the cathode chamber is provided with the gas discharge line 33. A drain valve 12 is at the bottom of the electrolytic tank.

The process cycle carried out with this apparatus is as follows:

In the cathode and anode chamber, there is initially as the electrolyte 8 a boiling ammonium nitrate solution with a concentration of about 250 g/l. The filtrate intended for reprocessing is then fed-in into the process through the line 7. The filtrate first passes through the heat changer 6 before entering the electrolysis tank 1 and is preheated therein. The preheated filtrate flows through the line 76 and the stub 32 into the boiling electrolyte in cathode chamber 31. The preheating can be additionally improved through a heat-exchange, not shown, of the filtrate with the gases discharged at 33.

Initially, some copper is added to this filtrate, so that no interfering cathodic hydrogen development occurs at the cathode 3; the cathode 3 then acts practically as a copper electrode. This copper character of the cathode 3 is always retained, since through partial separation of the copper coating, an always new deposition occurs. The filtrate fed-in via the stub 32 now likewise begins to boil and in the process gives off its content of ammonium carbonate and free $NH_3$ in the form of gaseous $CO_2$ and $NH_3$. These gases together with the steam formed by the boiling are discharged through the line 33 and are advantageously returned to the nuclear fuel production process. Thereby, the filtrate becomes an ammonium nitrate solution containing little uranium or plutonium. Due to the low solubility of the $NH_3$ in the ammonium nitrate solution at about 100° C., a pH-value of the solution of about 6 to 7 automatically adjusts itself. At this value, the possible $CO_3$ concentration is extremely low. Thereby, the uranium or plutonium, respectively, which was in solution as a carbonate complex before, precipitates as diuranate (hydroxide).

The entire electrolysis bath is recirculated via the pump 4, whereby the continuously produced precipitate is removed without problem by the filter 5 in the pump line. The direction of pumping is from the anode chamber into the cathode chamber, as shown. Since the expulsion of the $CO_2$ is not 100%, a small amount of uranium and plutonium, if present, remains in solution. However, this dissolved uranium is precipitated cathodically by the electrolysis and can be dissolved from the cathode 3 during the pauses in operation by means of acids.

Apart from the slight uranium separation, the electrolysis process has the effect of cathodically reducing the $NO_3^-$ to $NH_3$, which $NH_3$ escapes from the solution in the boiling heat. The water is anodically decomposed to $O_2$. The otherwise undesirable production of heat in electrolysis is utilized intentionally to keep the bath in the boiling state, to decompose the ammonium carbonate, to expel the ammonia and to evaporate the solution water.

This joulean heat is controlled by the cell voltage (which amounts to a few volts) in such a way that the evaporating volume of liquid is equal to the amount of the decomposed ammonium nitrate contained in this volume. This corresponds in turn to the fed-in amount of filtrate. Thus, this process operates completely continuously with constant concentrations and reaction rates.

Since, as already mentioned, oxygen is generated anodically and the latter could yield with $NH_3$ explosive mixtures, the electrolytic cell 1 is constructed in the manner shown. This design has the effect that the anode current density in the anode chamber 21 is less than the current density in the cathode chamber 31, so that desirably only the cathode chamber is in the boiling state. Since the fresh filtrate is fed only to the latter and the reduction of the $NO_3$ to $NH_3$ also takes place there, $NH_3$ escapes only there. Also since the cathode chamber is separated from the anode chamber by a partition 11, mixing of the oxygen generated at the anode with $NH_3$ is prevented with certainty. The oxygen is discharged through the line 22 and is diluted with additional air from the line 23.

The safety aspect (prevention of an explosion), already mentioned repeatedly, is taken into consideration with this method and the apparatus shown also by the provision that the electrodes 2 and 3 are immersed in the electrolysis bath only to about one-half of its depth. It is ensured thereby that in the event of a possible failure of the filtrate supply via the line 7 or a disturbance of the other control organs, not shown here, the concentration of the solution contained in the vessel can only be doubled, since then the electrodes no longer are immersed in the solution and the evaporation automatically ceases therewith. This concentration however, is still completely harmless.

In conclusion, it will be summarized that the temperature level is only about 100° C., as opposed to the thermal methods, mentioned at the outset, of 250° C. The heat transfer is direct and therefore practically lossless. The radioactive components are separated in the filter 5 in a very simple and dustfree manner and can be taken away from there in a known manner. The reaction products generated can be discharged into the atmosphere without danger or can be recycled, i.e., returned to the fuel manufacturing process (AUC process). The deposition products that can be taken off at the filter 5 exhibit an extremely large reduction in volume as compared to the starting solution and can be taken, further solidified in known manner, to the radioactive waste, or can be recycled. The electrolytically separated uranium or plutonium may be returned to the fuel manufacturing process in known manner.

I claim:

1. Method for reconditioning ammonium nitrate-containing radioactive filtrates which are aqueous solutions containing $NH_4$, $NO_3$, $CO_3$ and U and may also contain Pu, which comprises maintaining an electrolysis cell having an anode chamber and a cathode chamber and ammonium nitrate solution as electrolyte, decomposing water to oxygen and hydrogen in the electrolysis cell and also reducing nitrogen oxide in the cell with the hydrogen to produce $NH_3$, maintaining a boiling ammonium nitrate solution in the cathode chamber of the electrolysis cell, feeding said radioactive filtrate into the cathode chamber wherein this filtrate is brought to the boiling temperature with the assistance of the joulean heat of the electrolysis current, releasing gaseous $CO_2$ and $NH_3$ together with steam from the boiling ammonium nitrate solution in the cathode chamber, separately releasing oxygen from the anode chamber, converting soluble uranium compounds and plutonium if present in the ammonium nitrate solution to a precipitate containing uranium and plutonium if present suspended in the ammonium nitrate solution, recirculating said ammonium nitrate solution containing suspended precipitate through filter means to separate the precipitate, and also electrically precipitating dissolved uranium at the cathode.

2. Method according to claim 1, wherein the electric cell voltage is controlled so that the heat dissipation of the electrolysis current caused thereby brings about the evaporation of a volume of liquid which is approximately equal to that of the fed-in filtrate.

3. Method according to claims 1 or 2, wherein copper is added to the ammonium nitrate solution in the electrolysis cell.

4. Method according to claim 1, wherein the anode and cathode are immersed in the ammonium nitrate solution in the cell to less than about one-half its depth to provide a reservoir of ammonium nitrate solution in the lower portion of the cell which in the event of accidental failure of filtrate feed will only reach a safe limit of about double concentration of ammonium nitrate in solution.

5. Method according to claim 1, wherein the filtrate feed is preheated before introduction into the cathode chamber.

6. Method according to claim 5, wherein the filtrate feed is preheated by passing it in indirect heat exchange with the ammonium nitrate solution in the cell.

7. Method according to claim 1, wherein only the ammonium nitrate solution in the cathode chamber is in the boiling state by having the anode with a current density in the anode chamber less than the current density of the cathode in the cathode chamber.

8. Method according to claim 1, wherein dissolved plutonium is also electrically precipitated at the cathode.

* * * * *